United States Patent Office 3,514,371
Patented May 26, 1970

3,514,371
PREPARATION OF KRAFT PROCESS LIQUOR FROM WASTE SODA LIQUOR FROM PETROLEUM INDUSTRIES
Katsuo Watanabe, 219 Hama,
Okayama-shi, Okayama, Japan
No Drawing. Filed Mar. 1, 1967, Ser. No. 619,585
Claims priority, application Japan, Mar. 1, 1966, 41/12,012
Int. Cl. D21c *3/00*
U.S. Cl. 162—82        5 Claims

ABSTRACT OF THE DISCLOSURE

White liquor of desired sulfidity for digesting kraft process pulp is prepared by (a) introducing into waste soda liquor discharged from petroleum industries, gas comprising $H_2S$ and at least one additional gas from the group consisting of $CO_2$ and $SO_2$ and reacting the same until the normal salts content of the liquor is reduced to less than 15% based on its total salt content, (b) removing organic materials from the so reacted liquor, and (c) adding the resulting liquor to a digesting liquor selected from the group consisting of green liquor and white liquor. The resulting white liquor may be deodorized with weak oxidant, preferably air which has been washed with milk of lime. Especially when the digesting liquor comprises recovered white liquor, the addition (c) is preferably made in admixture with fresh NaOH solution.

---

This invention relates to a method for preparing a digesting liquor for the production of kraft process pulp (hereinafter called K. P. pulp), which comprises introducing a gas having $H_2S$ and at least one acidic gas selected from the group consisting of $CO_2$ and $SO_2$ into a waste caustic soda liquor, discharged from petroleum industries, reacting the gas and the liquor under a condition of increasing reaction temperature, removing therefrom organic oils at the end of the temperature elevation, and adding thus obtained oil free liquor to digesting liquor selected from the group consisting of recovered white liquor and green liquor in the K.P. pulp production process thereby preparing a white liquor for digesting K.P. pulp at a desired sulfidity level.

As is known to those skilled in the petroleum refining art, a waste caustic soda liquor from petroleum industries consists of small amount of alkali soluble organic acidic oils, in which mercaptans, phenols, thiophenols, naphthenic acids, fatty acids, etc., are included, and large amount of inorganic ingredients, in which NaOH, $Na_2S$, $Na_2CO_3$, $Na_2SO_3$, $Na_2S_2O_3$, etc., are included. The contents of the organic acidic oils are about 10% based on the total liquor. The following table, shows one example of the composition of the waste caustic soda liquor from petroleum industries.

TABLE 1

|  | Percent |
|---|---|
| NaOH | 17.30 |
| $Na_2S$ | 6.52 |
| $Na_2CO_3$ | 2.26 |
| $Na_2SO_3$ | 0.37 |
| $Na_2S_2O_3$ | 0.15 |
| Oils | 10.10 |

In the past, because of the difficulty in recovering valuable materials from it and its offensive smell, waste caustic soda liquor was disposed of in rivers or at sea, with consequent pollution; and at present the disposal problem is so serious that employment of the NaOH refining process, despite its advantages in desulfurizing and oil dissolving power, has been largely replaced by more expensive processes.

On the other hand, as is known also to those skilled in the papermaking art, the K.P. pulp digestion process is effected with a solution containing NaOH and $Na_2S$ as the main ingredients and the spent $Na_2S$ is supplied by $Na_2SO_4$ anhydride.

The supplied $Na_2SO_4$ is roasted in a heated reclaimer together with a recovered black liquor which was concentrated in the recovering process, then roasted with carbons of organic materials in the black liquor, thereby producing $Na_2S$.

The equation is as follows:

$$Na_2SO_4 + 2C \rightarrow Na_2S + 2CO_2\uparrow + 42 \text{ Kcal.}$$

while, the NaOH included in a recovered digesting liquor is converted to $Na_2CO_3$ in the heated reclaimer and again converted to NaOH at a step for causticizing. The equation is as follows:

$$Na_2CO_3 + Ca(OH)_2 \rightarrow 2NaOH + CaCO_3$$

The amount of the supplied $Na_2SO_4$ for obtaining 1 ton of pulp is about 50–90 kg. depending on the operating condition of apparatus, type of woods and digestion condition.

The recovered yields of said Na and S in said recovering process often fluctuate, and it is very difficult to control the sulfidity and the causticizing levels at a constant level.

However, the sulfidity for the K.P. pulp production is a most important factor directly affecting the quality and the cost of the pulp contained, and many attempts to improve the same have been proposed and tried without any successful results.

According to the present invention, it is established that NaSH can be used for the production of K.P. pulp in place of $Na_2SO_4$ used in the prior art. Further, the invention has disclosed that NaSH has the following characteristics when applied to the K.P. pulp production.

(1) The fines yields and the Roe number thereof are linearly decreased with the increasing amounts of NaSH. NaSH has an increased selectivity for hemicellulose and cellulose.

(2) When NaSH is used Roe number is decreased with increasing specific burst strength and specific tensile strength, while, other properties for determining paper strength are not decreased. NaSH has an excellent selectivity for lignin, resulting in higher paper strength.

(3) For changing sulfidity level at a constant Roe number, alkalinity and digestion tempertaure, digestion period may be controlled.

At a constant Roe number, increasing amount of NaSH produces stronger pulp and improved fines yields.

(4) At a constant Roe number, the pulp treated with NaSH has been improved in strength after bleaching.

As is seen from the above descriptions, the invention shows that NaSH can be used for preparing a white liquor for the pulp production, furthermore, use of NaSH for the production of K.P. pulp, makes it possible to add a sulfuring agent directly to a digesting white liquor, thus eliminating the difficulty in controlling the sulfidity level as in the prior conventional art. These facts form the basis for a novel process for the production of K.P. pulp by use of NaSH.

On the basis of the above described matters, there is provided a novel process for employing a caustic soda waste liquor from petroleum industries for the production of K.P. pulp according to the present invention.

The process according to the invention is characterized by treating a caustic soda waste liquor with a gas having $H_2S$ and at least one acidic gas selected from the group consisting of $CO_2$ and $SO_2$, reacting the gas and the waste liquor under increasing reaction temperature, removing therefrom organic oils at the end of the temperature elevation, and thereafter adding thus obtained oil free waste liquor to digesting liquor selected from the group consisting of recovered white liquor or green liquor for the production of K.P. pulp, thereby preparing a digesting white liquor for the production of any desired sulfidity of K.P. pulp.

According to the present invention, caustic soda waste liquor can be easily separated from acidic organic oils like mercaptans by treating it with a gas having $H_2S$ and at least one acidic gas selected from the group consisting of $SO_2$ and $CO_2$, thus converting Na-salts like $Na_2S$, $Na_2CO_3$, $Na_2SO_3$, etc., into the corresponding acidic salts like NaSH, $NaHSO_3$, etc., and lowering the acidity thereof, down to a level of 5-15% of said normal salts based on the total amounts of the salts.

In case the obtained oil free NaOH waste liquor has still an offensive smell by the presence of a trace amount of mercaptans, the liquor may be further treated with an oxygen bearing inert gas such as air or decarbonized air for the partial oxidation thereof, or with a desired weak oxidant, up to a level at which less than 5% of the NaSH therein is converted to corresponding normal salts, thus effecting the oxidation of the mercaptan while preventing the essential ingredients of NaSH, $Na_2S$, etc., from the oxidation thereof. Thus obtained liquor can be added to a recovered white liquor or a green liquor without any fear of an offensive smell.

As is disclosed herein above, for the production of K.P. pulp, the caustic soda waste liquor is available and has many advantages compared with the conventional prior art.

Accordingly, one object of the present invention is to employ a waste caustic soda liquor discharged from petroleum industries for the production of K.P. pulp. Another object of the present invention is to eliminate disadvantages of using a soda refining process in petroleum industries. Another object of the present invention is to establish a commercially available use of said waste caustic soda liquid. A further main object of the present invention is to provide a novel process for preparing a digesting white liquor for the production of K.P. pulp by employing the said waste caustic soda liquor, thereby obtaining an improved control of sulfidity.

In the prior art, it is essential matter to supply $Na_2SO_4$ at a point ahead of a heated reclaimer for recovery of the waste liquor and it is quite impossible to supply the $Na_2SO_4$ directly into a green liquor or white liquor in the recovering step. Accordingly, in the conventional prior art, not only are the loss of $Na_2SO_4$, many undesirable reactions and heat loss is inevitable, but also control of sulfidity level is very difficult.

In contrast, according to the present invention, it is very easy to supply the waste liquor, depending on its carbonate content, directly into a green liquor or white liquor in the recovering step; many disadvantages of the prior art are avoided and the furnace damage which is a very serious problem in pulp production can be greatly decreased, thus making it possible to control the sulfidity of recovered white liquor. Furthermore, the process of the present invention can be employed in combination with the prior art for the production of K.P. pulp, and thus better results can be easily obtained.

In conclusion, the process according to the present invention has made it possible to employ a waste caustic soda liquor from petroleum industries without any fear of an offensive smell and pollution in surroundings. Thus, the caustic soda waste liquor is made available for the production of K.P. pulp, thereby providing a novel process for preparing a digesting white liquor for the production of K.P. pulp.

The present invention is further explained by the following examples and it should be noted that they are only for the better disclosure of the invention and the invention is not limited thereto.

EXAMPLE 1.—REMOVAL OF ACIDIC OILS

As is disclosed hereinbefore, removal of acidic oils in the waste caustic soda liquor discharged from petroleum industries is the most important problem of the waste soda liquor. For the removal of the acidic oils, in this example the following gas composition is employed.

TABLE 2

| | Percent |
|---|---|
| $C_{1-5}$ | 13.56 |
| $H_2S$ | 76.10 |
| $CO_2$ | 10.14 |
| $SO_2$ | 0.20 |

The said gas is reacted under a pressure of 3 kg./cm.² g. with a waste caustic soda liquor of the following composition.

TABLE 3

| | Percent |
|---|---|
| NaOH | 17.30 |
| $Na_2S$ | 6.52 |
| $Na_2CO_3$ | 2.26 |
| $Na_2SO_3$ | 0.37 |
| $Na_2S_2O_3$ | 0.15 |
| Oils | 10.10 |

After the completion of the reaction, the acidic oils content is removed and a resulting solution having reducing Na-salts is obtained. The composition of said solution is as follows:

TABLE 4

| | Percent |
|---|---|
| NaSH | 28.91 |
| $Na_2S$ | 2.12 |
| $NaHCO_3$ (calculated as $Na_2CO_3$) | 1.47 |
| $Na_2SO_3$ | 0.52 |
| $Na_2S_2O_3$ | 0.23 |
| Oils | Trace |

As is seen from the above table, the total amount of normal salts is converted to about 8% based on the total salt and almost all the Na-salts content of the acidic organic materials is released as the free form of acidic organic materials or the sulphur compounds thereof, thereby obtaining a solution applicable to control the sulfidity in K.P. pulp digesting liquor.

EXAMPLE 2.—DEODORIZING THE DIGESTING SOLUTION

The digesting solution thus obtained still has a trace amount of the oils containing mercaptans therein, and the deodorizing thereof is often required for many purposes. The deoderizing can be effected by partial-oxidation with air or other weak oxidants. In this example, air is washed with milk of lime for preventing undesirable increase in the carbonates such as $NaHCO_3$, $Na_2CO_3$, etc. in the deodorized solution. Thus processed air is contacted with the oil free solution of Table 4 and the resulting deodorized solution shows the following composition.

TABLE 5

| | Percent |
|---|---|
| NaSH | 28.50 |
| $Na_2S$ | 2.62 |
| $NaHCO_3$ | 1.23 |
| $Na_2SO_3$ | 0.57 |
| $Na_2S_2O_3$ | 0.26 |
| Oils | Trace |
| Mercaptan smell | None |

Thus, it is confirmed that about 1.5% of the acidic salts based on the total amount of the acidic salts in the solution is converted to the corresponding normal salts and the mercaptans slightly present the residual oils are completely changed to the stable form of sulphur compounds of no offensive smell. Said decarbonizing of air is not essential for preparing a white liquor for digestion and may be omitted if desired.

EXAMPLE 3.—PREPARATION OF A DIGESTING WHITE LIQUOR

As is disclosed above in detail, for the production of K.P. pulp, it is very difficult to control the sulfidity of the white liquor recovered, because the recovered yields of Na and S are mainly depend on both the spent amount thereof in the digestion process and the loss in the recovering step, especially in the heated reclaimer.

Further, the difficulty is the greater because the conversion yield of the supplied $Na_2SO_4$ to $Na_2S$ is dependent on the operating conditions.

However, according to the present invention, the control of the liquor composition, especially the sulfidity of the white liquor is easily attained.

Thus all above disadvantages can be eliminated by adding the oil free waste liquor directly, or mixed with fresh NaOH solution, to a green liquor or white liquor.

In the following table, A and B indicate the recovered white liquor composition in which the sulfidity thereof are 27.20 and 21.11 respectively.

TABLE 6

|  | A (g./l.) | B (g./l.) |
|---|---|---|
| NaOH | 81.37 | 91.57 |
| $Na_2S$ | 30.68 | 24.19 |
| $Na_2CO_3$ | 13.49 | 14.20 |
| $Na_2SO_3$ | 3.64 | 3.68 |
| $Na_2S_2O_3$ | 3.67 | 3.74 |
| $Na_2SO_4$ | 1.56 | 4.10 |
| Sulfidity | 27.40 | 21.00 |

According to this example, the oil free waste soda liquor composition of Table 4 is added directly to the A and B compositions of Table 6 respectively, in order to prepare the white liquor (a fresh NaOH solution may be added to a green liquor for obtaining the same result after a causticizing step).

For the recovered white liquor B, it is not essential to add an additional amount of fresh NaOH solution, while for the recovered white liquor A, it is essential to employ an additional amount of NaOH, the amount of which is dependent on the respective operating conditions. The obtained white liquor shows the following compositions.

TABLE 7

|  | A (g./l.) | B (g./l.) |
|---|---|---|
| NaOH | 83.11 | 84.91 |
| $Na_2S$ | 32.32 | 33.67 |
| $Na_2CO_3$ | 7.83 | 14.26 |
| $Na_2SO_3$ | 2.16 | 3.72 |
| $Na_2S_2O_3$ | 2.07 | 3.72 |
| $Na_2SO_4$ | 0.84 | 4.01 |
| Sulfidity | 28.00 | 28.50 |

Referring to the above table, the white liquor A is obtained by adding 60 parts of the oil free waste soda liquor of Table 4 and 800 parts of 10% NaOH solution, to 1000 parts of the recovered white liquor A of Table 6 and the sulfidity thereof is 28.26 that is the increase of 1.06 in sulfidity. The white liquor B of said Table 7 is obtained by adding only 20 parts of the oil free waste soda liquor of Table 4 to 1000 parts of the recovered white liquor of Table 6B and the sulfidity is 28.67 that is the increase of 7.56 in sulfidity.

EXAMPLE 4

Digestion is effected by a conventional method employing the digesting white liquor of Table 7A, thereby highly improving the fines yields thereof.

What I claim is:
1. A process for preparing a white liquor for digesting kraft process pulp, which comprises the steps of:
   (a) introducing a gas containing $H_2S$ and at least one acidic gas selected from the group consisting of $CO_2$ and $SO_2$ into a waste soda liquor discharged from petroleum industries,
   (b) effecting the reaction of the gas and the liquor until the normal salts contents of the liquor is reduced to less than 15% based on its total salt content,
   (c) removing organic materials from the so reacted liquor, and
   (d) then adding said liquor to a digesting liquor selected from the group consisting of white liquor and green liquor for digesting kraft process pulp, for preparing a desired sulfidity of white liquor.

2. A process as claimed in claim 1, in which the liquor prepared by step (d) is deodorized by contacting the same with weak oxidant.

3. A process as claimed in claim 2 in which said weak oxidant is air which has been washed with milk of lime.

4. A process as claimed in claim 1, wherein the liquor prepared in step (c) is added to the digesting liquor in step (d) in admixture with fresh NaOH solution.

5. A process as claimed in claim 4 wherein the digesting liquor to which the addition is made in step (d) comprises recovered white liquor.

References Cited
UNITED STATES PATENTS

| 806,954 | 12/1905 | Colahan | 162—72 |
| 867,704 | 10/1907 | Colahan | 162—72 |
| 3,322,615 | 5/1967 | Kamiya | 162—72 |

HOWARD R. CAINE, Primary Examiner

U.S. Cl. X.R.

162—29, 72; 252—192